United States Patent
Sasakawa et al.

(10) Patent No.: US 9,755,233 B2
(45) Date of Patent: Sep. 5, 2017

(54) NONAQUEOUS ELECTROLYTE BATTERY AND BATTERY PACK

(71) Applicant: Kabushiki Kaisha Toshiba, Minato-ku (JP)

(72) Inventors: Tetsuya Sasakawa, Yokohama (JP); Norio Takami, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 0 days.

(21) Appl. No.: 15/063,801

(22) Filed: Mar. 8, 2016

(65) Prior Publication Data

US 2016/0190581 A1 Jun. 30, 2016

Related U.S. Application Data

(63) Continuation of application No. PCT/JP2013/075060, filed on Sep. 17, 2013.

(51) Int. Cl.
*H01M 4/58* (2010.01)
*H01M 4/36* (2006.01)
(Continued)

(52) U.S. Cl.
CPC ............ *H01M 4/582* (2013.01); *C01G 9/006* (2013.01); *C01G 45/006* (2013.01);
(Continued)

(58) Field of Classification Search
CPC ........... H01M 4/364; H01M 2004/028; H01M 10/0525; H01M 2220/20; C01G 45/006;
(Continued)

(56) References Cited

U.S. PATENT DOCUMENTS

2012/0007020 A1 1/2012 Tarascon et al.
2012/0052401 A1* 3/2012 Goodenough ......... C01G 33/00
429/341
(Continued)

FOREIGN PATENT DOCUMENTS

| JP | 2012-506361 | 3/2012 |
| JP | 2012-506361 A | 3/2012 |
| JP | 2013-140734 | 7/2013 |
| JP | 2013-163602 | 8/2013 |
| WO | WO 2012/146842 A1 | 11/2012 |

OTHER PUBLICATIONS

"A 3.90 V iron-based flurosulphate materail for lithium-ion batteries crystallizing in the triplite structure", Barpanda et al. Aug. 21, 2011.*

(Continued)

*Primary Examiner* — Mark F Huff
*Assistant Examiner* — Monique Wills
(74) *Attorney, Agent, or Firm* — Oblon, McClelland, Maier & Neustadt, L.L.P.

(57) ABSTRACT

According to one embodiment, a nonaqueous electrolyte battery includes a positive electrode, a negative electrode and a nonaqueous electrolyte. The positive electrode includes a first positive electrode active material which is represented by general formula $LiMSO_4F$ (M is at least one kind of element selected from the group consisting of Fe, Mn and Zn) and has a triplite type crystal structure, and a second positive electrode active material which is represented by general formula $LiM'SO_4F$ (M' is at least one kind of element selected from the group consisting of Fe, Mn and Zn) and has a tavorite type crystal structure.

11 Claims, 9 Drawing Sheets

(51) Int. Cl.
| | |
|---|---|
| *H01M 10/0525* | (2010.01) |
| *C01G 45/00* | (2006.01) |
| *C01G 49/00* | (2006.01) |
| *C01G 9/00* | (2006.01) |
| *H01M 4/48* | (2010.01) |
| *H01M 4/485* | (2010.01) |
| *H01M 4/583* | (2010.01) |
| *H01M 4/62* | (2006.01) |
| *H01M 4/02* | (2006.01) |

(52) U.S. Cl.
CPC .......... *C01G 49/009* (2013.01); *H01M 4/364* (2013.01); *H01M 4/366* (2013.01); *H01M 4/48* (2013.01); *H01M 4/485* (2013.01); *H01M 4/583* (2013.01); *H01M 4/5825* (2013.01); *H01M 4/625* (2013.01); *H01M 10/0525* (2013.01); *C01P 2002/76* (2013.01); *C01P 2006/40* (2013.01); *H01M 2004/028* (2013.01); *H01M 2220/20* (2013.01); *H01M 2220/30* (2013.01); *Y02E 60/122* (2013.01); *Y02T 10/7011* (2013.01)

(58) Field of Classification Search
CPC ... C01G 49/009; C01G 9/006; C01P 2002/76; C01P 2006/40
See application file for complete search history.

(56) References Cited

U.S. PATENT DOCUMENTS

| | | | |
|---|---|---|---|
| 2012/0129050 A1 | 5/2012 | Tarascon et al. | |
| 2012/0319655 A1* | 12/2012 | Ravet | C01B 25/45 320/128 |
| 2015/0024248 A1* | 1/2015 | He | H01M 10/056 429/144 |

OTHER PUBLICATIONS

"Understanding and Promoting the Rapoid Prepartion of the Triplite-Phase of LiFeSo4F for Use as a Large-Potential Fe Cathode"—Ati et al, 2012.*

International Search Report issued Nov. 12, 2013 in PCT/JP2013/075060, filed Sep. 17, 2013 (with English Translation).

Written Opinion issued Nov. 12, 2013 in PCT/JP2013/075060, filed Sep. 17, 2013.

Mohamed Ati et al. "Understanding and Promoting the Rapid Preparation of the Triplite-Phase of LiFeSo$_4$F for Use as a Large-Potential Fe Cathode", Journal of the American Chemical Society, vol. 134, 2012, 8 pages.

P. Barpanda et al. "A 3.90 V Iron-Based Fluorosulphate Material for Lithium-Ion Batteries Crystallizing in the Triplite Structure", Nature Materials, vol. 10, Oct. 2011, 8 pages.

Office Action issued Sep. 13, 2016 in Japanese Patent Application No. 2015-537452 (with unedited computer generated English translation).

* cited by examiner

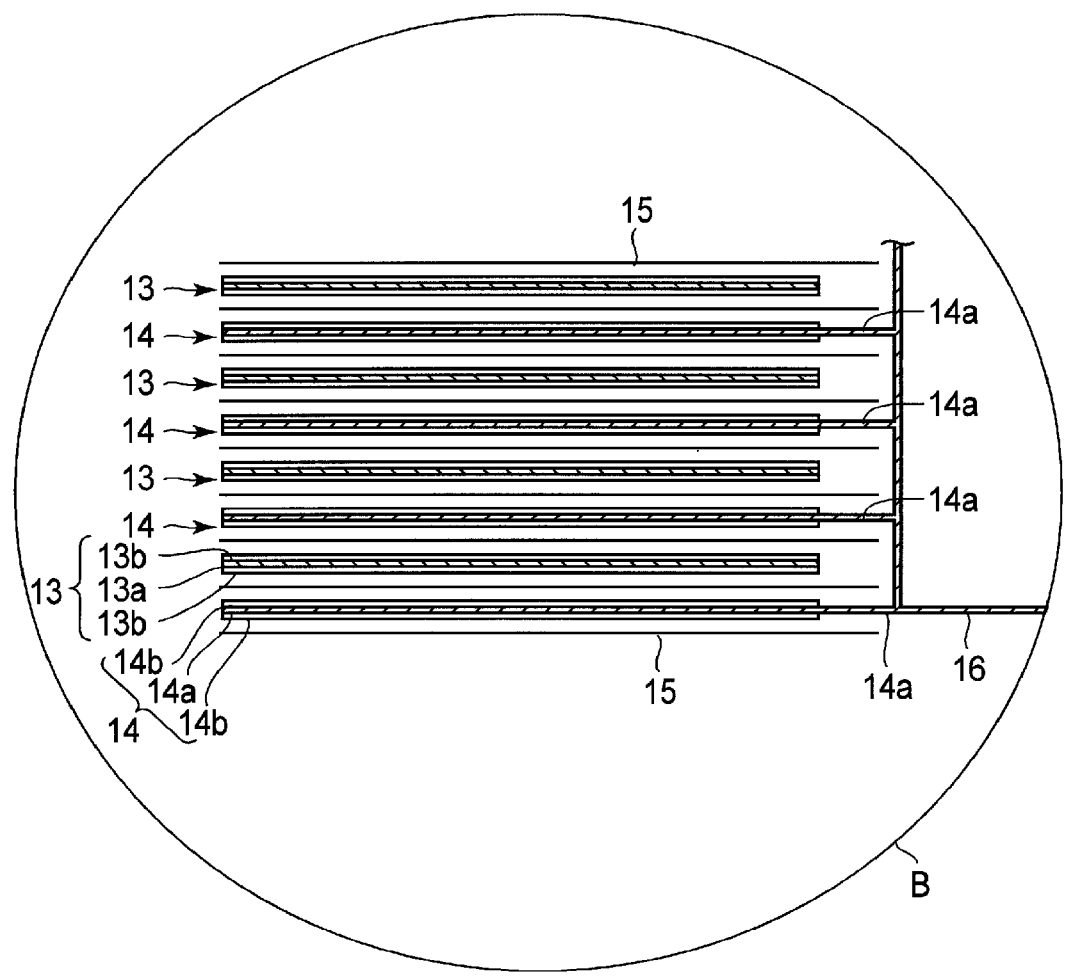
F I G. 4

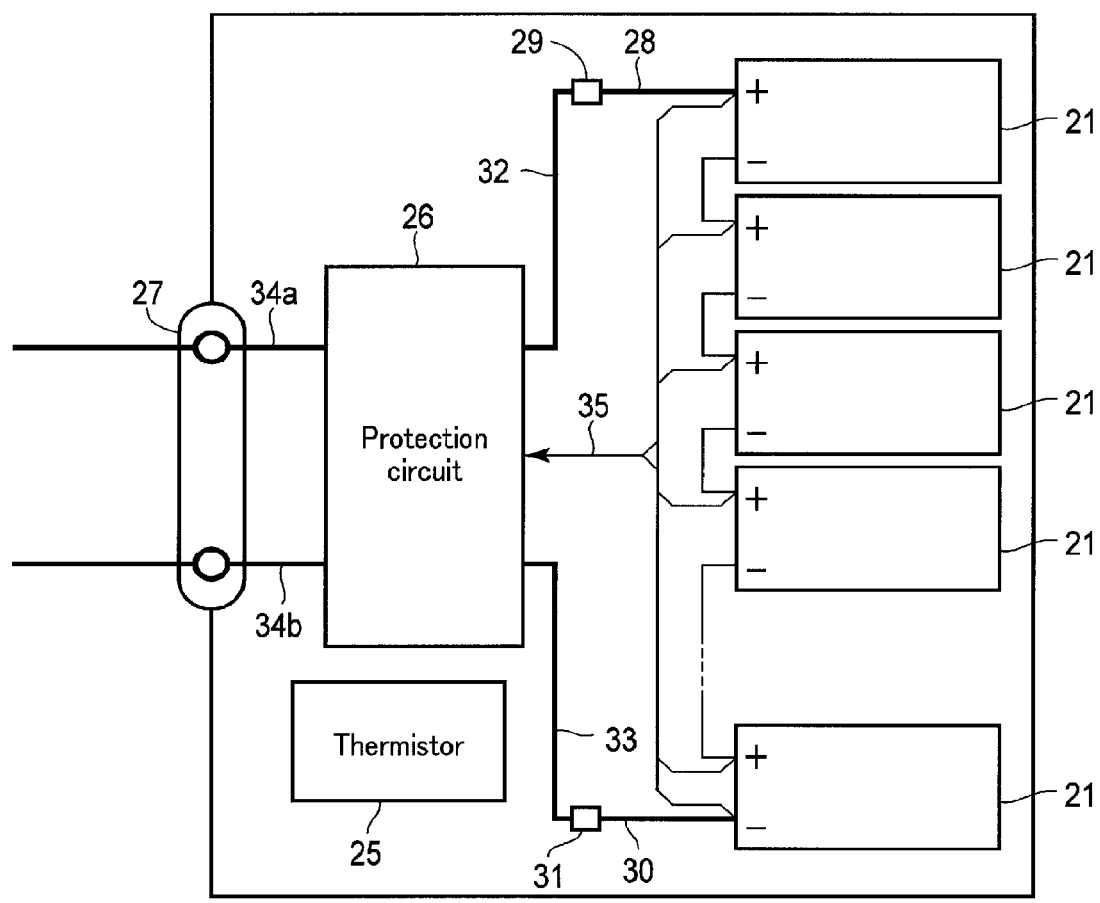
F I G. 6

NONAQUEOUS ELECTROLYTE BATTERY AND BATTERY PACK

CROSS-REFERENCE TO RELATED APPLICATIONS

This application is a Continuation Application of PCT Application No. PCT/JP2013/075060, filed Sep. 17, 2013, the entire contents of which are incorporated herein by reference.

FIELD

Embodiments relate to a nonaqueous electrolyte battery and a battery pack.

BACKGROUND

In the application of a lithium ion secondary battery for electric automobiles and hybrid electric automobiles, further increasing the density of electric energy is required. At present, although $LiFePO_4$ and the like are put to practical use as a highly safe positive electrode material, the average working electric potential thereof is as low as 3.4 V based on Li. In order to increase the energy density of the lithium ion secondary battery, a positive electrode active material with higher working electric potential is needed.

Recently, as a positive electrode material to meet the aforementioned requirement, $Li(Fe, Mn)SO_4F$ having a crystal structure of the tavorite type or triplite type is widely studied. As the average working electric potential of $Li(Fe, Mn)SO_4F$ of the tavorite type is 3.6 V (vs. $Li/Li^+$), and the average working electric potential of $Li(Fe, Mn)SO_4F$ of the triplite type is 3.9 V (vs. $Li/Li^+$), these are promising as next-generation secondary battery positive electrode materials with high energy density. However, because an electric potential change in electric charge and discharge of the positive electrode material of the tavorite type is small, the depth of charge is difficult to measure when used in combination with a negative electrode with similarly small electric potential change. And, the positive electrode material of the triplite type has a problem in that reduction in electric potential in a final stage of discharge is rapid, which leads to low output at the low depth of charge.

BRIEF DESCRIPTION OF DRAWINGS

FIG. 4 is an enlarged cross-sectional view of part B of FIG. 3.

FIG. 6 is a block diagram showing an electric circuit of the battery pack of FIG. 5.

DETAILED DESCRIPTION

First Embodiment

Figure 1:
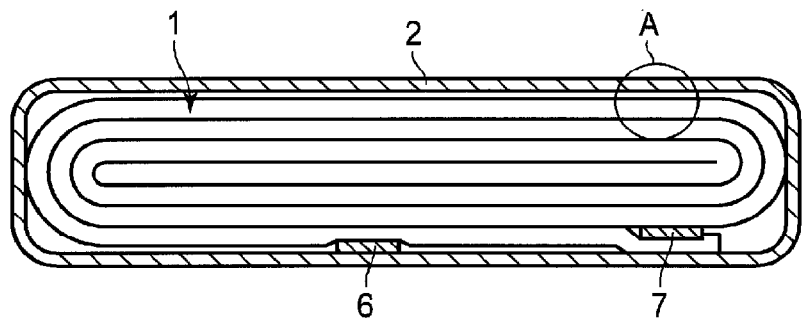
FIG. 1 is a cross-sectional view of a flat type nonaqueous electrolyte battery according to a first embodiment.

According to a first embodiment, a nonaqueous electrolyte battery containing a positive electrode, a negative electrode and a nonaqueous electrolyte are provided. The positive electrode contains a first positive electrode active material represented by the general formula $LiMSO_4F$ (M is at least one kind of element selected from the group consisting of Fe, Mn and Zn. The element can be of one kind or two kinds or more.) and having the triplite type crystal structure, and a second positive electrode active material represented by the general formula $LiM'SO_4F$ (M' is at least one kind of element selected from the group consisting of Fe, Mn and Zn. The element can be of one kind or two kinds or more.) and having the tavorite type crystal structure. On the other hand, the negative electrode contains the negative electrode active material.

The first positive electrode active material is able to have a high electric potential of 3.9 V (vs. $Li/Li^+$) as an average working electric potential, but not a high output in the low depth of charge (SOC) because of a large reduction in electric potential at the final stage of discharging. On the other hand, the second positive electrode active material is excellent in the flatness of charging and discharging electric potential, though an average working electric potential is 3.6 V (vs. $Li/Li^+$), and the change of electric potential is small from the initial stage to the final stage of charging and discharging. A positive electrode that contains a mixture of the first positive electrode active material and the second positive electrode active material realizes a high positive electrode electric potential and enables the depth of discharge to be measured by the change of electric potential from the initial stage to the final stage of charging and discharging, and enables a high output to be obtained at the low depth of charge (SOC) without causing a rapid drop in electric potential in the final stage of discharge.

It is desirable that the negative electrode active material has a difference of not more than 0.3 V between the negative electrode potential versus lithium at a 10% depth of discharge and negative electrode potential versus lithium at a 90% depth of discharge, when discharged at a rate of 0.2 C from the fully charged state of the nonaqueous electrolyte battery to the completely discharged state. As the negative electrode containing such a negative electrode active material is excellent in flatness of electric potential at a depth of discharge of from 10% to 90%, thereby enabling the depth of discharge to be measured by the change of electric potential from the initial stage to the final stage of charging and discharging by the combination with the positive electrode containing the first positive electrode active material and the second positive electrode active material. Furthermore, the energy density can be increased, because a high voltage is achieved.

It is desirable that the ratio of the mass of the first positive electrode active material to the total mass of the first positive electrode active material and the second positive electrode active material is in a range of not less than 1 mass % and not more than 99 mass %. By being in this range, the change of voltage from the initial stage to the final stage of charging and discharging can be suited to the measurement of the depth of charge, and at the same time output at the low depth of charge (SOC) can be furthermore enhanced. A more preferable range is not less than 10 mass % and not more than 90 mass %.

The mixing ratio of the first positive electrode active material and the second positive electrode active material can be determined from the composition ratio when Rietveld analysis was performed in the X-ray diffraction measurements under the mixed crystal of the triplite structure (space group C2/c) and tavorite structure (space group P-1).

In order to increase the electric conductivity of the positive electrode active material, at least one part of the surface of at least one of the first positive electrode active material and the second positive electrode active material may be coated with a carbon-containing layer. The positive electrode active material can be of one kind or two kinds or more. As the carbon material contained in the carbon-containing layer, for example, at least one kind of material selected from the group consisting of acetylene black, carbon black and graphite can be cited. The carbon material can be of one kind or two kinds or more.

The first positive electrode active material and the second positive electrode active material are desirably positive electrode active material particles with an average diameter in the range not less than 0.1 μm and not more than 10 μm. A more preferable range is not less than 0.1 μm and not more than 1 μm. The average diameter of the particles can be measured by observation with a transmission electron microscope (TEM).

The positive electrode active material can be synthesized, for example, by a method explained in the following. The first positive electrode active material having the triplite structure can be obtained, for example, by adding the sulfate hydrate of the element M ($MSO_4.H_2O$) and lithium fluoride to 1-ethyl-3-methylimidazolium-bis(trifluoromethanesulfonyl)imide in a sealed container and heating them at a temperature in a range of not lower than 260° C. and not higher than 400° C. On the other hand, the second positive electrode active material having the tavorite structure can be obtained, for example, by placing sulfate hydrate of the element $SO_4.H_2O$) and lithium fluoride in a sealed container under an atmosphere of argon and heating at a temperature in a range of not lower than 260° C. and not higher than 400° C.

In the following, the positive electrode containing this positive electrode active material will be explained.

The positive electrode includes a positive electrode current collector and a positive electrode material layer (a layer containing the positive electrode active material). The positive electrode material layer is formed one side or both sides of the surfaces of the positive electrode current collector, and comprises the first positive electrode active material, the second positive electrode active material, a conducting agent and a binder.

The conducting agent enhances the performance of current collection of the active material, and suppresses the resistance of contact with the current collector. Examples of the conducting agent include carbonaceous materials such as acetylene black, carbon black, or graphite. The conducting agent can be of one kind or two kinds or more.

The binder binds the active material and the conducting agent. Examples of the binder include polytetrafluoroethylene (PTFE), poly(vinylidene difluoride) (PVdF), and fluorinated rubbers. The binder can be of one kind or two kinds or more.

It is preferable that the active material, the conducting agent and the binder in a positive electrode material layer are combined in a ratio of not less than 80 mass % and not more than 95 mass %, not less than 3 mass % and not more than 18 mass %, and not less than 2 mass % and not more than 17 mass % respectively. The conducting agent can display the above-described effect when in an amount of not less than 3 mass %. The conducting agent can reduce the decomposition of the nonaqueous electrolyte at the surface of the conducting agent in storage at a high temperature when in an amount of not more than 18 mass %. The binder can give a sufficient strength to the positive electrode when in an amount of not less than 2 mass %. The binder can reduce the internal resistance when in an amount of not more than 17 mass %, as the binder is an insulating material in the positive electrode.

It is preferable that the positive electrode current collector is, for example, aluminum foil, or aluminum alloy foil containing at least one kind of element selected from the group consisting of Mg, Ti, Zn, Mn, Fe, Cu and Si. The element can be of one kind or two kinds or more.

The positive electrode is made, for example, by suspending the first positive electrode active material, the second positive electrode active material, the conducting agent and the binder in a common solvent to prepare a slurry, and by applying this slurry on the positive electrode current collector and drying, followed by pressing. The positive electrode may be made by configuring the first positive electrode active material, the second positive electrode active material, the conducting agent and the binder into a pelletized positive electrode material layer on the positive electrode current collector.

The nonaqueous electrolyte battery of the first embodiment can further contain a separator placed between the positive electrode and the negative electrode, and an container member. The container member houses the positive electrode, the negative electrode, the separator and the nonaqueous electrolyte. In the following, the negative electrode, the nonaqueous electrolyte, the separator and the container member will be explained.

1) Negative Electrode

The negative electrode comprises the negative electrode current collector and the negative electrode material layer (a layer containing the negative electrode active material). The negative electrode material layer is formed on one side or both side of the surfaces of the negative electrode current collector, and comprises the negative electrode active material, the conducting agent and the binder.

It is preferable that the negative electrode active material has a potential difference of not more than 0.3 V between the negative electrode potential versus lithium at a depth of discharge of 10% and the negative electrode potential versus lithium at a depth of discharge of 90% when discharged at a rate of 0.2 C from the fully charged state of nonaqueous electrolyte battery to the completely discharged state.

Examples of the negative electrode active material of a potential difference not more than 0.3 V comprise lithium titanium oxide, titanium oxide, niobium titanium composite oxide, and carbon material. The negative electrode active material can be of one kind or two kinds or more.

Examples of the lithium titanium oxide comprise $Li_{4+x}Ti_5O_{12}$ (x is $-1 \leq x \leq 3$) having a spinel structure and $Li_{2+x}Ti_3O_7$ (x is $-1 \leq x \leq 3$) having a ramsdellite structure.

Examples of the titanium oxide comprise $TiO_2$ having an anatase structure and $TiO_2$ (B) having a monoclinic crystal system. $TiO_2$ (B) heat treated in a range of 300-500° C. is preferable. $TiO_2$ (B) preferably contains 0.5-10 mass % of Nb. Thereby, the negative electrode can have a high capacity. Titanium oxide after the battery is charged and discharged can be represented by $Li_dTiO_2$ (0<d≤1) because some lithium may remain irreversibly in the titanium oxide.

Examples of the niobium titanium composite oxide comprise $Li_xNb_aTi_bO_d$ (0≤x≤3, 0<a≤3, 0<b≤3, 5≤c≤10). Examples of the $Li_xNb_aTi_bO_c$ comprise $Li_xNb_2TiO_7$, $Li_xNb_2Ti_2O_9$, and $Li_xNbTiO_5$. $Li_xTi_{1-y}Nb_yNb_2O_{7+\sigma}$ (0≤x≤3, 0≤y≤1, 0≤σ≤0.3) heat treated at 800° C.-1200° C. has a high true density and can increase the specific volume capacity. $Li_xNb_2TiO_7$ is preferable because of its high density and high capacity. This can make capacity of the negative electrode high. Some of Nb or Ti in the above mentioned oxides may be replaced by at least one kind of element selected from the group consisting of V, Zr, Ta, Cr, Mo, W, Ca, Mg, Al, Fe, Si, B, P, K and Na. The element can be of one kind or two kinds or more.

Examples of the carbon material comprise a graphite material or carbonaceous material (for example, graphite, cokes, carbon fibers, spherical carbon, vapor phase pyrolysis carbonaceous material, calcined resin and others).

The conducting agent enhances a current collecting performance of the negative electrode active material and suppresses the contact resistance with the negative electrode current collector. Examples of the conducting agent comprise acetylene black, carbon black and graphite. The conducting agent can be of one kind or two kinds or more.

The binder can bind the negative electrode active material and the conducting agent. Examples of the binder comprise polytetrafluoroethylene (PTFE), poly(vinylidene difluoride) (PVdF), fluorinated rubbers, and styrene-butadiene rubbers. The binder can be of one kind or two kinds or more.

It is preferable that the negative electrode active material, the conducting agent and the binder in the negative electrode material layer are combined in a ratio of not less than 70 mass % and not more than 96 mass %, not less than 2 mass % and not more than 28 mass %, and not less than 2 mass % and not more than 28 mass %, respectively. The amount of conducting agent of not less than 2 mass % can enhance the current collecting performance of the negative electrode material layer, and the characteristics of the nonaqueous electrolyte battery under a large electrical current. The amount of binder of not less than 2 mass % can improve the binding of the negative electrode material layer with the current collector, and cycling characteristics. On the other hand, it is preferable for increasing the capacity of the battery that the amount of the conducting agent and the binder are not more than 28 mass % in each.

It is preferable that the negative electrode current collector is aluminum foil or aluminum alloy foil containing at least one kind of element selected from the group consisting of Mg, Ti, Zn, Mn, Fe, Cu and Si which element is electrochemically stable in a range of electric potential nobler than 1 V (vs. $Li/Li^+$). The element can be of one kind or two kinds or more.

The negative electrode is made, for example, by suspending the negative electrode active material, the conducting agent and the binder in a common solvent to prepare a slurry, then by applying this slurry on the negative electrode current collector and drying, followed by pressing. The negative electrode may be made by configuring the negative electrode active material, the conducting agent and the binder into a pelletized negative electrode material layer on the negative electrode current collector.

2) Nonaqueous Electrolyte

As the nonaqueous electrolyte, for example, the liquid nonaqueous electrolyte prepared by dissolving an electrolyte in an organic solvent, or a gel nonaqueous electrolyte prepared by compositing a liquid electrolyte and a polymer material can be used.

It is preferable that in the liquid nonaqueous electrolyte, the electrolyte is dissolved in an organic solvent in a concentration of not less than 0.5 M and not more than 2.5 M.

Examples of the electrolyte comprise lithium salts such as lithium perchlorate ($LiClO_4$), lithium phosphate hexafluoride ($LiPF_6$), lithium borate tetrafluoride ($LiBF_4$), lithium arsenic hexafluoride ($LiAsF_6$), lithium tri fluoromethanesulfonate ($LiCF_3SO_3$), bis-trifluoromethyl sulfonylimide lithium $[LiN(CF_3SO_2)_2]$, or a mixture thereof. The electrolyte preferably resists oxidization even at a high electric potential, and $LiPF_6$ is most preferable. The kinds of electrolyte can be one kind or two or more.

Examples of the organic solvent comprise cyclic carbonate such as propylene carbonate (PC), ethylene carbonate (EC) or vinylene carbonate; chain carbonate such as diethyl carbonate (DEC), dimethyl carbonate (DMC) or methylethyl carbonate (MEC); cyclic ether such as tetrahydrofuran (THF), 2-methyl tetrahydrofuran (2MeTHF) or dioxolane (DOX); chain ether such as dimethoxyethane (DME) or diethoxyethane (DEE); γ-butyrolactone (GBL), acetonitrile (AN), and sulfolane (SL). These organic solvents can be used alone or in the form of a mixed solvent.

Examples of the polymer material comprise poly(vinylidene difluoride) (PVdF), polyacrylonitrile (PAN), and poly(ethylene oxide) (PEO).

A preferable organic solvent is a mixed solvent of at least two or more from the group consisting of propylene carbonate (PC), ethylene carbonate (EC) and diethyl carbonate (DEC), or a mixed solvent containing γ-butyrolactone (GBL). By using these mixed solvents, a nonaqueous electrolyte battery with excellent high temperature characteristics can be obtained.

3) Separator

As the separator, for example, a porous film or nonwoven fabric made of a synthetic resin can be used. As the material constituting the separator, at least one kind selected from the group consisting of polyethylene, polypropylene, cellulose and poly(vinylidene difluoride) (PVdF) can be cited. A porous film containing polyethylene or polypropylene can improve the safety because it can interrupt electrical current by melting at a certain temperature.

4) Container Member

The container member is formed from a laminate film with a thickness of not more than 0.5 mm, or a container made of a metal with a thickness of not more than 1 mm. The thickness of the metal is preferably not more than 0.5 mm.

The shape of the container member can be selected from a flat type (thin type), square type, cylindrical type, coin type, and button type. Examples of the container member comprise, for example, the container member for a small size battery loaded on a portable electronic instrument and the like, and the container member for a large size battery loaded on a two or four wheeled automobile and the like, and are depended on the size of the battery.

As a laminate film, a multi-layer film interposed by a metal layer between resin layers is used. The metal layer is preferably aluminum foil or aluminum alloy foil for weight reduction. As the resin layer, for example, one kind or more of polymer materials selected from polypropylene (PP), polyethylene (PE), nylon, poly(ethylene terephthalate) (PET) and the like can be used. The laminate film can be shaped into the container member by heat sealing.

The metal container is made of aluminum or aluminum alloy and the like. It is preferable that the aluminum alloy is an alloy containing one kind or more elements selected from magnesium, zinc, silicon and the like. In the case that one or more kind of transition metal such as iron, copper, nickel, chromium and the like is contained in the alloy, the amount thereof is preferably not more than 100 mass ppm.

In the case that the positive electrode and the negative electrode are taken out from the nonaqueous electrolyte battery to confirm a mixing ratio and electric potential, the positive electrode and the negative electrode are taken out from the nonaqueous electrolyte battery by a method explained in the following. After the battery is deconstructed in a discharged state and the positive electrode and the negative electrode are taken out, each of the positive electrode and the negative electrode is washed in ethyl methyl carbonate. After being washed, the positive electrode and the negative electrode are placed in a vacuum chamber to remove any remaining ethyl methyl carbonate by evaporation at reduced pressure.

The nonaqueous electrolyte battery (nonaqueous electrolyte secondary battery) of the embodiment will be explained in more detail with reference to the drawings. Each figure is a schematic diagram to aid in understanding the embodiment. The shapes, dimensions, ratios and the like differ from actual apparatuses in some points, but such can be appropriately changed by taking the following explanation and known technology onto account.

Figure 2:
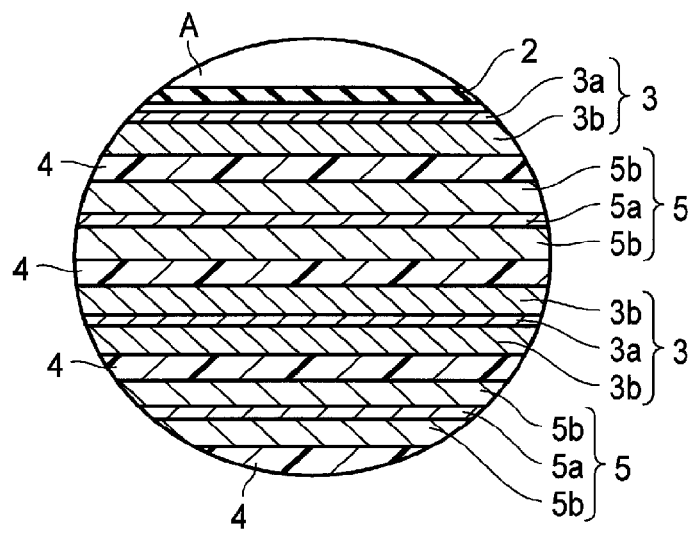
FIG. 2 is an enlarged cross-sectional view of part A of FIG. 1.

A flat wound electrode group 1 is housed in a baggy container member 2 comprising a laminate film interposed by a metal layer between two resin layers. The flat spirally wound electrode group 1 is formed by winding the laminated product laminated in the order of the negative electrode 3, the separator 4, the positive electrode 5, the separator 4 from outside as shown in FIG. 2, followed by pressing.

The negative electrode 3 contains the negative electrode current collector 3a and the layer 3b containing the negative electrode active material. The negative electrode 3 of an outermost layer has a structure wherein the layer 3b containing the negative electrode active material is formed on the one side of the inner surface of the negative electrode current collector 3a as shown in FIG. 2. In other negative electrodes 3, the layer 3b containing the negative electrode active material is formed on both sides of the negative electrode current collector 3a. In the positive electrode 5, the layer 5b containing the positive electrode active material is formed on both sides of the positive electrode current collector 5a.

As shown in FIG. 1, in the neighborhood of the periphery of the wound electrode group 1, a negative electrode terminal 6 is connected to the negative electrode current collector 3a of the outermost layer of the negative electrode 3, and the positive electrode terminal 7 is connected to the positive electrode current collector 5a of the inner positive electrode 5. The negative electrode terminal 6 and positive electrode terminal 7 are extended through the opening of the baggy container member 2 outside. For example, a liquid nonaqueous electrolyte is added from the opening of the baggy container member 2. The wound electrode group 1 and the liquid nonaqueous electrolyte are sealed by heat sealing the opening of the baggy container member 2. The negative electrode terminal 6 and the positive electrode terminal 7 are interposed between the opening of the baggy container member 2.

The negative electrode terminal is electrochemically stable in electric potential under the insertion and extraction of Li by the negative electrode active material, and can be formed from a material having electrical conductivity. As the material, copper, nickel, stainless steel, aluminum, alternatively, aluminum alloy containing at least one kind of element selected from the group consisting of Mg, Ti, Zn, Mn, Fe, Cu and Si and the like can be particularly cited. The element can be of one kind or two kinds or more. It is preferable that the negative electrode terminal is formed from a material similar to that of the negative electrode current collector in order to reduce contact resistance with the negative electrode current collector.

It is better that the positive electrode terminal is formed from a material which has electrical stability and conductivity in a range of not less than 3 V and not more than 5 V, preferably not less than 3 V and not more than 4.25 V of electric potential versus lithium ion/metal. Particularly, aluminum, or aluminum alloy containing at least one kind of element selected from the group consisting of Mg, Ti, Zn, Ni, Cr, Mn, Fe, Cu and Si and the like are cited. The element can be of one kind or two kinds or more. It is preferable that the positive electrode terminal is formed from a material similar to that of the positive electrode current collector in order to reduce the contact resistance with the positive electrode current collector.

Figure 3:
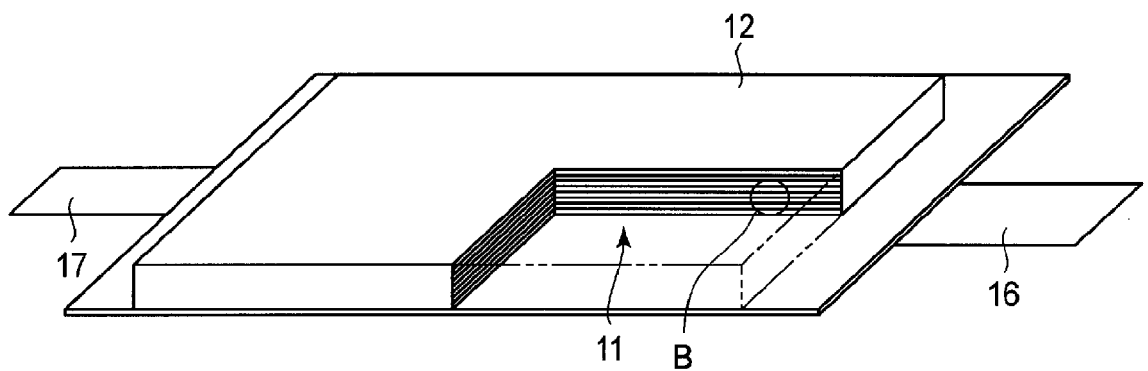
FIG. 3 is a partial notched perspective view schematically showing a flat type nonaqueous electrolyte battery according to the first embodiment.

The nonaqueous electrolyte battery of the embodiment is not restricted to ones of the structure shown in FIG. 1 and FIG. 2, but may be, for example, the battery of the structure shown in FIG. 3 and FIG. 4.

The electrode group of a laminate type 11 is housed in the container member 12 comprising a laminate film interposed by a metal layer between two resin films. The electrode group of a laminate type 11 has a structure wherein the positive electrode 13 and the negative electrode 14 are alternatively laminated and interposed by separators 15 between them as shown in FIG. 4. More than one positive electrode 13 is present and each comprises the current collector 13a and the layer containing the positive electrode active material 13b carried by both surfaces of the current collector 13a. More than one negative electrode 14 is present and each comprises the current collector 14a and the layer containing the negative electrode active material 14b carried by both surfaces of the current collector 14a. One side of the negative electrode current collector 14a of each negative electrode 14 protrudes from the negative electrode 14. The protruding negative electrode current collector 14a is electrically connected to band-shaped negative electrode terminal 16. The tip of the band-shaped negative electrode terminal 16 is drawn out from the container member 11 to the outside. Though not shown, one side of the positive electrode current collector 13a of the positive electrode 13 protrudes from the positive electrode 13, the side of the positive electrode current collector 13a being positioned opposite to the protruding side of the negative electrode current collector 14a. The positive electrode current collector 13a protruding from the positive electrode 13 is electrically connected to the band-shaped positive electrode terminal 17. The tip of the band-shaped positive electrode terminal 17 is positioned opposite to the negative electrode terminal 16 and drawn out from the side of container member 11 to the outside.

According to the nonaqueous electrolyte battery of the first embodiment described above, a high positive electrode potential is realized, and the electric potential change from the initial stage to the final stage of charging and discharging is enabled by the measurement of the depth of discharge, and a high output can be obtained at a low depth of charge (SOC) because the battery comprises the positive electrode containing the first positive electrode active material and the second positive electrode active material.

Second Embodiment

The battery pack of a second embodiment will be explained referring to the drawings. The battery pack of the second embodiment has one or more nonaqueous electrolyte batteries of the second embodiment (unit cell). In the case that more than one single battery is included, each single battery is configured with a series or parallel connection. It is desirable that the battery pack is provided with a protection circuit capable of detecting the voltage of the nonaqueous electrolyte battery.

Figure 5:
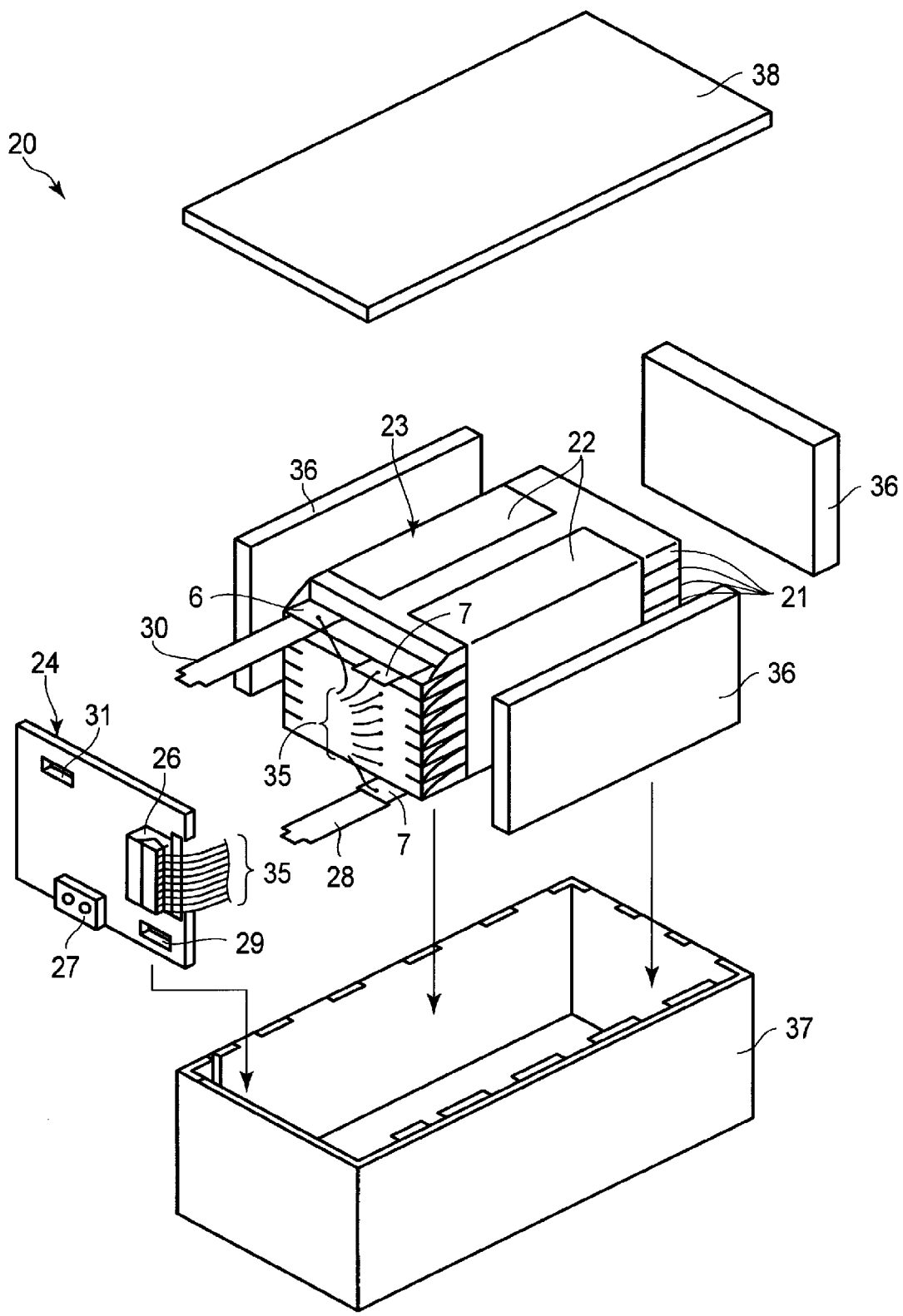
FIG. 5 is a perspective view of a deconstructed battery pack according to a second embodiment.

One example of battery pack 20 is shown in FIG. 5 and FIG. 6. This battery pack 20 contains more than one flat type battery 21 having the structure shown in FIG. 1. More than one unit cell 21 is laminated in such a way that the negative electrode terminal 6 and the positive electrode terminal 7 extending outside are arranged in the same direction, constituting a battery module 23 by binding with adhesive tape 22. These unit cells 21 are electrically connected in series as shown in FIG. 6.

The printed wiring board 24 is arranged to face a side surface of a unit cell 21 from which the negative electrode terminal 6 and the positive electrode terminal 7 are extended. On a printed wiring board 24 is a thermistor 25, protection circuit 26 and terminal 27 for supplying electricity to an instrument outside, as shown in FIG. 6. On the surface of the printed wiring board 24 facing the battery module 23, an insulating plate (not shown) is attached to avoid unnecessary connection with the wiring of the battery module 23.

The positive electrode lead wire 28 is connected to the positive electrode terminal 7 positioned on the bottom layer of the battery module 23, and the tip thereof is inserted in the positive electrode connector 29 of the printed wiring board 24 and electrically connected. The negative electrode lead wire 30 is connected to the negative electrode terminal 6 positioned at the top layer of the battery module 23, and the tip thereof is inserted in the negative electrode connector 31 of the printed wiring board 24 and electrically connected. These connectors 29, 31 are connected to the protection circuit 26 through the wiring 32, 33 formed in the printed wiring board 24.

The thermistor 25 detects the temperature of the unit cell 21 and transmits the detection signal to the protection circuit 26. The protection circuit 26 can break the positive electrode wiring 34a and the negative electrode wiring 34b between the protection circuit 26 and the terminal 27 for supplying electricity to an instrument outside under a predetermined condition. The predetermined condition is the time, for example, when the detected temperature by the thermistor 25 reaches a predetermined temperature or higher. In addition, the predetermined condition is the time when overcharge, overdischarge, overcurrent or the like of the unit cell 21 is detected. The detection of this overcharge and the like is performed on each of the unit cells 21 or the battery module. In the case of detection of the unit cell 21, battery voltage may be detected, or either a positive electrode potential or negative electrode potential may be detected. In the latter case, a lithium electrode is inserted into each of the unit cells 21 for use as the reference electrode. In the case of FIG. 5 and FIG. 6, the wirings 35 are connected to the unit cell 21 for detecting each voltage, and detection signals are transmitted to the protection circuit 26 through these wirings 35.

The protection sheets 36 comprising rubber or resin are arranged on the three side faces of the battery module 23 respectively except a side face from which the positive electrode terminal 7 and the negative electrode terminal 6 protrude.

The battery module 23 is housed in the housing container 37 together with each of the protection sheets 36 and the printed wiring board 24. That is, the protection sheets 36 are respectively arranged on both inner surfaces of a longitudinal direction and the inner surface of one side of a transverse direction of the housing container 37, and the printed wiring board 24 is arranged on the inner surface of the other side of the transverse direction. The battery module 23 is positioned in a space surrounded by the protection sheet 36 and the printed wiring board 24. The cover 38 is attached to the top surface of the housing container 37.

In order to fix the battery module 23, heat-shrinkable tape may be used instead of adhesive tape 22. In this case, protection sheets are placed on the surfaces of both sides of the battery module and heat-shrinkable tubing is wound around them and then the heat-shrinkable tube is thermally contracted to bind the battery module.

FIG. 5 and FIG. 6 show the form of unit cells 21 connected in series, but they may be connected in parallel to increase battery capacity. Alternatively, series and parallel connections may be combined. The combined battery packs may be further connected in series or parallel.

Aspects of the battery pack may be changed depending on the use, as appropriate. The battery pack is appropriately used for applications in which cycling characteristics are required when a large electrical current is taken out. In particular, it is appropriately used as a power source of a digital camera, or for example, as a battery for vehicles such as a hybrid electric automobile with two or four wheels, an electric automobile with two or four wheels, and an assisted bicycle. Particularly, it is appropriately used as a battery for vehicles.

According to the second embodiment as described above, the battery pack can be provided which can enable measurement of the depth of charge by an electric potential change from the initial stage to the final stage of charging and discharging while realizing a high energy density, and is able to obtain high output at a low depth of charge (SOC) because the battery pack comprises the nonaqueous electrolyte battery of the first embodiment.

EXAMPLES

In the following, Examples will be explained in detail.

Example A-1

To N-methylpyrrolidone (NMP) were added 88 mass % of $Li_4Ti_5O_{12}$ of the spinel structure, 6 mass % of acetylene black as a conducting material, and 6 mass % of poly (vinylidene difluoride) (PVdF), which was mixed to prepare a slurry. After this slurry was applied to both surfaces of the current collector comprising aluminum foil with a thickness of 15 μm, it was dried and pressed to make a negative electrode.

In a sealed container, sulfate hydrate of Mn ($MnSO_4.H_2O$) and lithium fluoride were enclosed together with 1-ethyl-3-methylimidazolium-bis(trifluoromethanesulfonyl)imide, and heated at 300° C. for three days to synthesize $LiFe_{0.9}Mn_{0.1}SO_4F$ having a triplite type crystal structure as the first positive electrode active material. In addition, sulfate hydrate of Mn ($MnSO_4$—$H_2O$) and lithium fluoride were enclosed in a sealed container under an atmosphere of argon, and heated at 300° C. for three days, to synthesize LiFe$_{0.9}$Mn$_{0.1}$SO$_4$F having a tavorite type crystal structure as the second positive electrode active material.

The content of the first positive electrode active material was adjusted to 90 mass % based on the total amount (100 mass %) of the first positive electrode active material and the second positive electrode active material. A slurry was prepared by adding 88 mass % of the positive electrode active material comprising the first positive electrode active material and the second positive electrode active material and 6 mass % of acetylene black as the conductive material and 6 mass % of poly(vinylidene difluoride) (PVdF) to N-methylpyrrolidone (NMP), and mixing. After this slurry was applied to both surfaces of the current collector comprising aluminum foil with a thickness of 15 μm, it was dried and pressed to make a positive electrode.

Fabrication of a Test Cell

The laminate of the positive electrode and the negative electrode interposed by a separator made of polypropylene was housed in a container made of a laminate film containing aluminum together with the electrolyte solution to obtain the test cell. The capacity of the test cell was made to be 1 Ah. An electrolyte solution was prepared by dissolving 1 mol/L of LiPF$_6$ as the electrolyte in a mixed solvent (volume ratio of 1:2) of ethylene carbonate and diethyl carbonate.

Examples A-2 to A-9

A test cell was made under the same conditions as Example A-1 except that the mass ratio of the first positive electrode active material based on the total mass of the first positive electrode active material and the second positive electrode active material was changed as shown in Table 1 given below.

Comparative Example A-1

A test cell was made under the same conditions as Example A-1 except that only LiFe$_{0.9}$Mn$_{0.1}$SO$_4$F having the triplite type crystal structure was used as the positive electrode active material.

Comparative Example A-2

A test cell was made under the same conditions as Example A-1 except that only LiFe$_{0.9}$Mn$_{0.1}$SO$_4$F having the tavorite type crystal structure was used as the positive electrode active material.

Example B-1

A test cell was made under the same conditions as Example A-1 except that only TiO$_2$ (B) was used as the negative electrode active material.

Examples B-2 to B-9

A test cell was made under the same conditions as Example B-1 except that the mass ratio of the first positive electrode active material based on the total mass of the first positive electrode active material and the second positive electrode active material was changed as shown in Table 2 given below.

Comparative Example B-1

A test cell was made under the same conditions as Example B-1 except that only LiFe$_{0.9}$Mn$_{0.1}$SO$_4$F having the triplite type crystal structure was used as the positive electrode active material.

Comparative Example B-2

A test cell was made under the same conditions as Example B-1 except that only LiFe$_{0.9}$Mn$_{0.1}$SO$_4$F having the tavorite type crystal structure was used as the positive electrode active material.

Example C-1

A test cell was made under the same conditions as Example A-1 except that only Nb$_2$TiO$_7$ was used as the negative electrode active material.

Examples C-2 to C-9

A test cell was made under the same conditions as Example C-1 except that the mass ratio of the first positive electrode active material based on the total mass of the first positive electrode active material and the second positive electrode active material was changed as shown in Table 3 given below.

Comparative Example C-1

A test cell was made under the same conditions as Example C-1 except that only LiFe$_{0.9}$Mn$_{0.1}$SO$_4$F having the triplite type crystal structure was used as the positive electrode active material.

Comparative Example C-2

A test cell was made under the same conditions as Example C-1 except that only LiFe$_{0.9}$Mn$_{0.1}$SO$_4$F having the tavorite type crystal structure was used as the positive electrode active material.

Example D-1

Graphite was used as the negative electrode active material. 90 mass % of this negative electrode active material and 10 mass % of poly(vinylidene difluoride) (PVdF) were added to N-methylpyrrolidone (NMP) and mixed to prepare a slurry. This slurry was applied to both surfaces of the current collector comprising copper foil with a thickness of 15 μm, and then dried and pressed to make the negative electrode. A test cell was made under the same conditions as Example A-1 except that this negative electrode was used.

Examples D-2 to D-9

A test cell was made under the same conditions as Example D-1 except that the mass ratio of the first positive electrode active material based on the total mass of the first positive electrode active material and the second positive electrode active material was changed as shown in Table 4 given below.

Comparative Example D-1

A test cell was made under the same conditions as Example D-1 except that only LiFe$_{0.9}$Mn$_{0.1}$SO$_4$F having the triplite type crystal structure was used as the positive electrode active material.

Comparative Example D-2

A test cell was made under the same conditions as Example D-1 except that only LiFe$_{0.9}$Mn$_{0.1}$SO$_4$F having the tavorite type crystal structure was used as the positive electrode active material.

Example E-1

A test cell was made under the same conditions as Example A-1 except that only LiFe$_{0.9}$Zn$_{0.1}$SO$_4$F having the triplite type crystal structure was used as the first positive electrode active material.

Examples E-2 to E-9

A test cell was made under the same conditions as Example E-1 except that the mass ratio of the first positive electrode active material based on the total mass of the first positive electrode active material and the second positive electrode active material was changed as shown in Table 5 given below.

Comparative Example E-1

A test cell was made under the same conditions as Example E-1 except that only LiFe$_{0.9}$Zn$_{0.1}$SO$_4$F having the triplite type crystal structure was used as the positive electrode active material.

Comparative Example E-2

A test cell was made under the same conditions as Example E-1 except that only LiFe$_{0.9}$Mn$_{0.1}$SO$_4$F having the tavorite type crystal structure was used as the positive electrode active material.

Example F-1

A test cell was made under the same conditions as Example A-1 except that only LiFeSO$_4$F having the tavorite type crystal structure was used as the second positive electrode active material.

Examples F-2 to F-9

A test cell was made under the same conditions as Example F-1 except that the mass ratio of the first positive electrode active material based on the total mass of the first positive electrode active material and the second positive electrode active material was changed as shown in Table 6 given below.

Comparative Example F-1

A test cell was made under the same conditions as Example F-1 except that only LiFe$_{0.9}$Mn$_{0.1}$SO$_4$F having the triplite type crystal structure was used as the positive electrode active material.

Comparative Example F-2

A test cell was made under the same conditions as Example F-1 except that only LiFeSO$_4$F having the tavorite type crystal structure was used as the positive electrode active material.

After each test cell was charged at a constant current at the 0.1 C rate, charging until the current value decreased at a constant voltage mode was carried out and the change in the cell voltage was measured against the discharged capacity when discharged from the fully charged state at the 0.1 C rate. In the results thereof, Examples A-1 to D-1 and Comparative Examples A-1 to D-1 are shown in FIGS. 8 to 11. After the test cell was discharged from the fully charged state to a depth of discharge of 80% at a constant current of 0.1 C rate, and kept in an open circuit state for one hour, the test cell was discharged at the 10 C rate for 10 seconds to measure the value of the cell resistance from the difference of voltage before and after discharge. The results show a 10 second direct current resistance (mΩ) at a depth of discharge of 80% in Table 1-6.

Furthermore, concerning Li$_4$Ti$_5$O$_{12}$ of the spinel structure, TiO$_2$(B), Nb$_2$TiO$_7$, and graphite used in each test cell, the negative electrode potential curve (V vs. Li/Li$^+$) at a depth of discharge of from 0% to 100% when the nonaqueous electrolyte battery was discharged from the fully charged state to the completely discharged state at a 0.2 C rate was measured by a method explained below. In the measurement, a three-pole cell using Li metal was used as a counter electrode and a reference electrode. The electric potential vs. Li at a lower limit and upper limit in charging and discharging was set to be 1.4 V and 2.0 V for Li$_4$Ti$_5$O$_{12}$, TiO$_2$(B), Nb$_2$TiO$_7$, and 0.05 V and 2.0 V for graphite, respectively.

Figure 7:
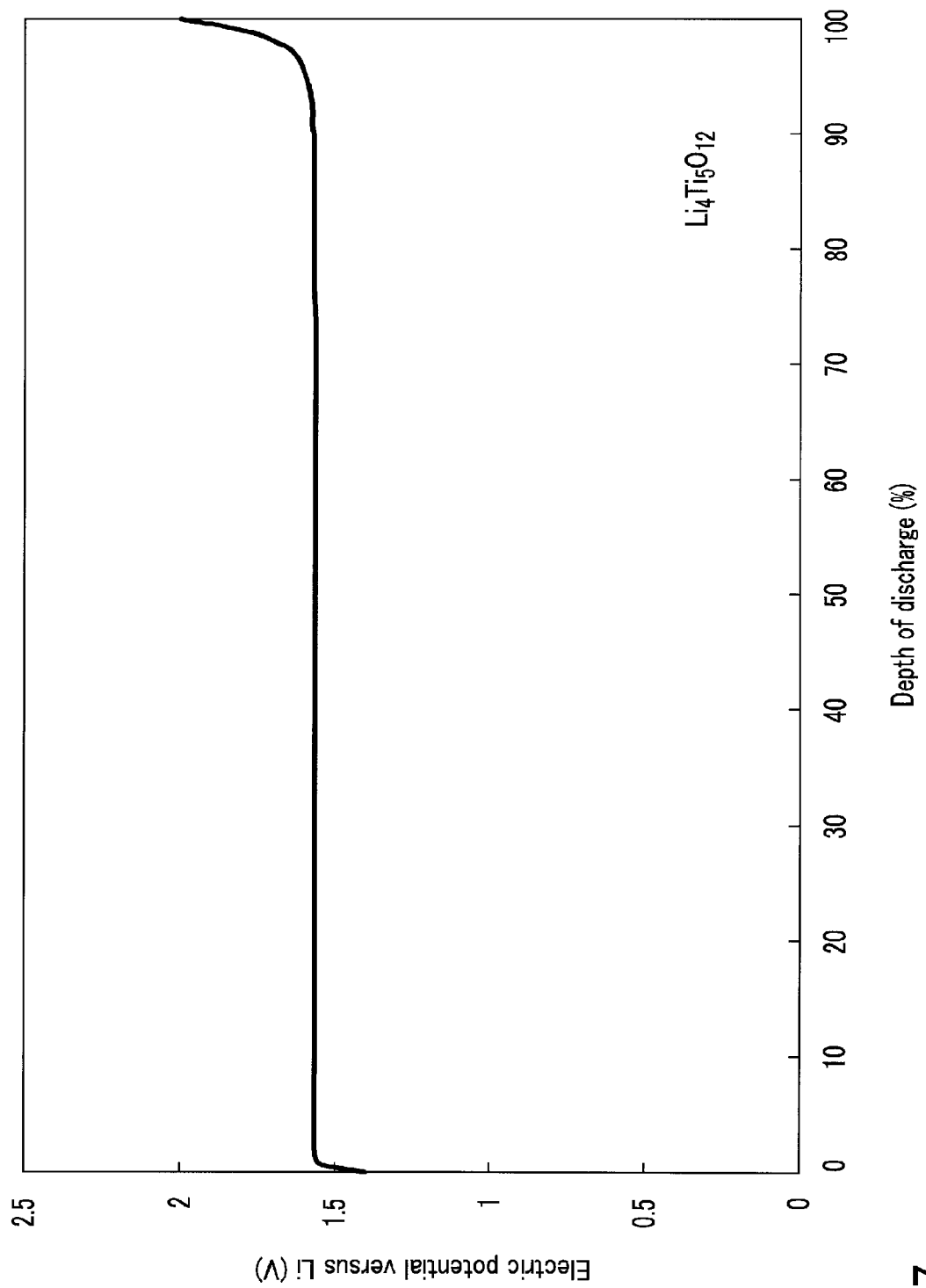
FIG. 7 is a figure showing negative electrode potential curves of a battery of Example A-1.
Figure 8:
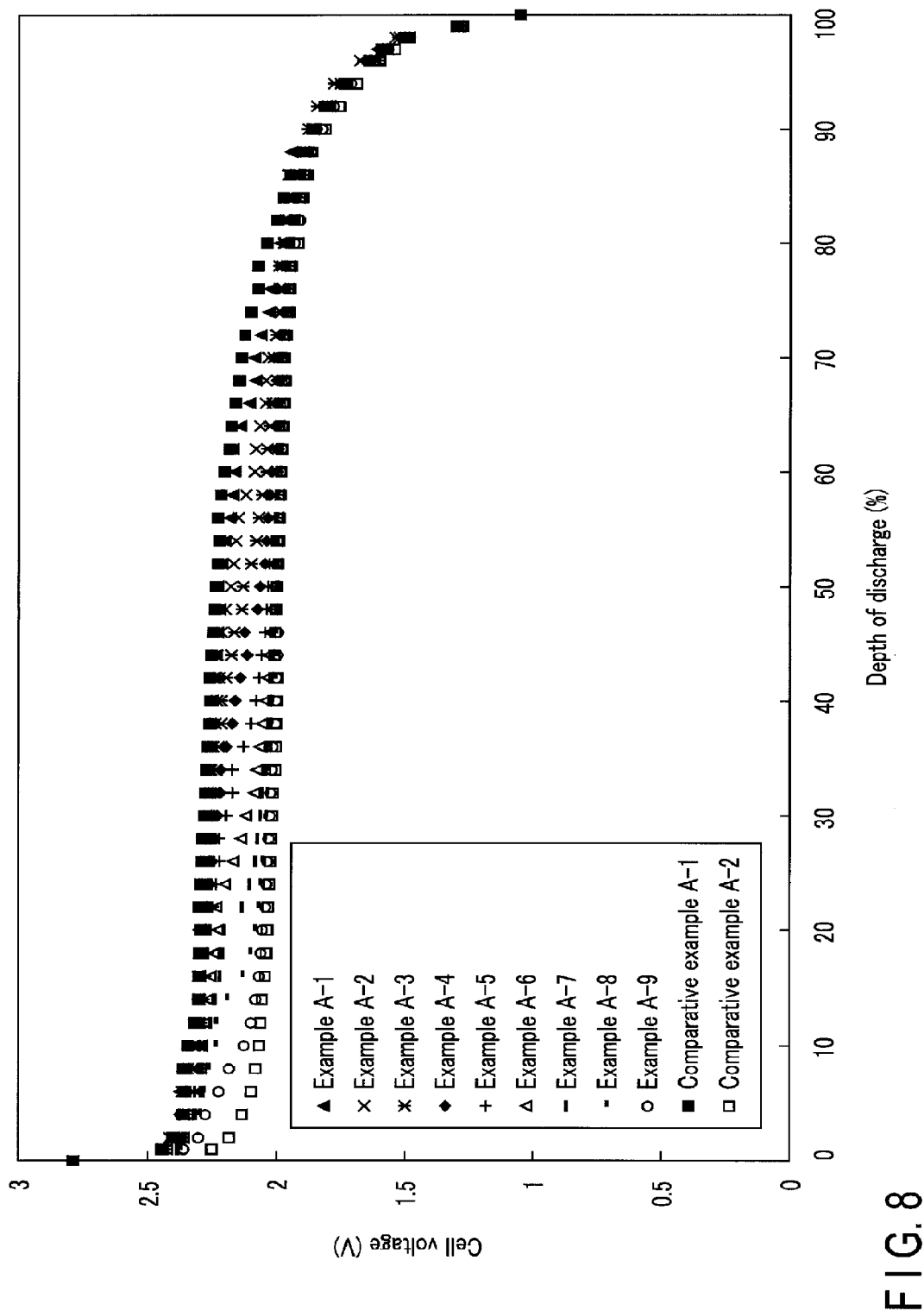
FIG. 8 is a figure showing discharging voltage curves of batteries of Example A-1 to Comparative Example A-2.
Figure 9:
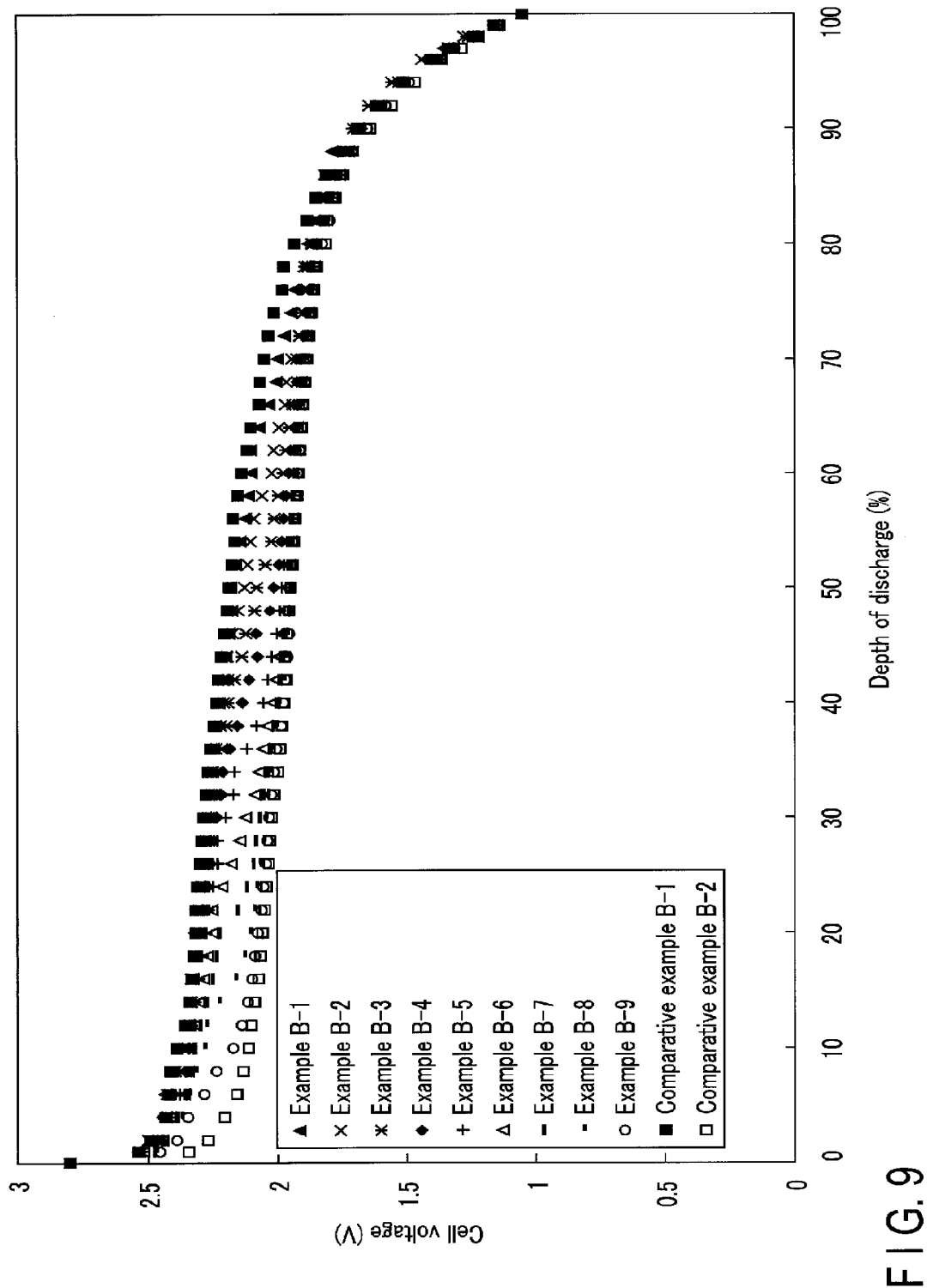
FIG. 9 is a figure showing discharging voltage curves of batteries of Example B-1 to Comparative Example B-2.
Figure 10:
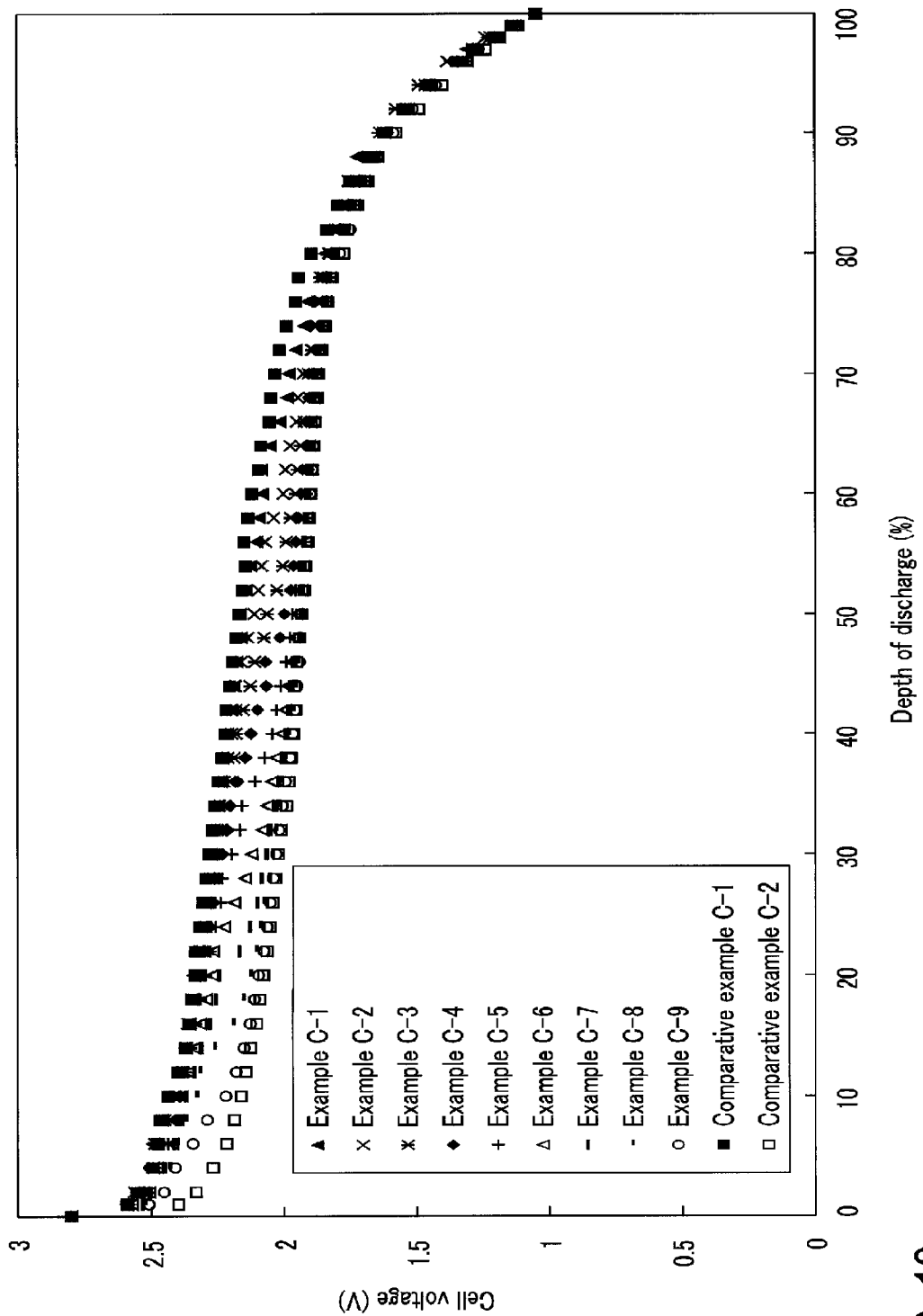
FIG. 10 is a figure showing discharging voltage curves of batteries of Example C-1 to Comparative Example C-2.
Figure 11:
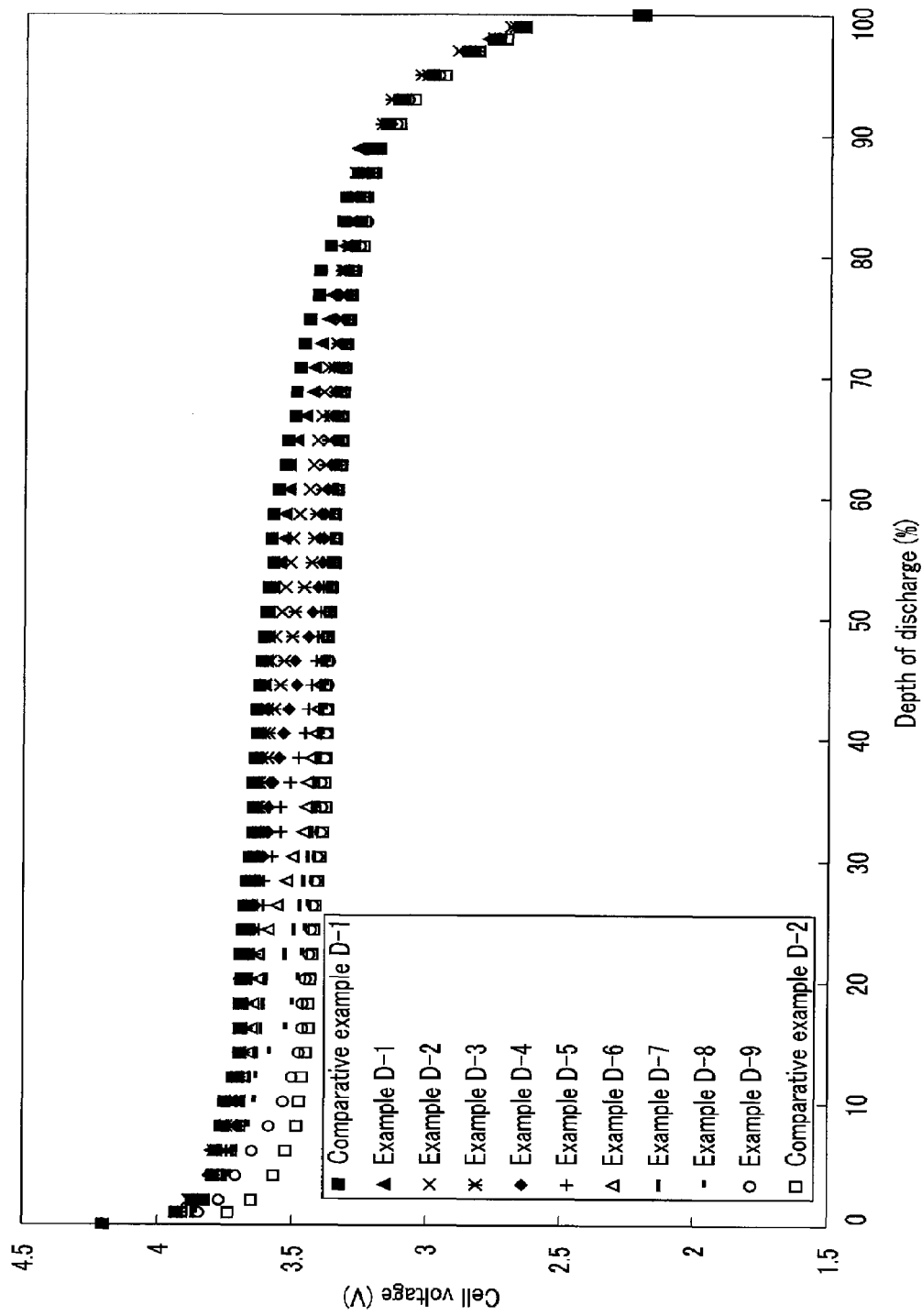
FIG. 11 is a figure showing discharging voltage curves of batteries of Example D-1 to Comparative Example D-2.

The negative electrode potential curve of Example A-1 is shown in FIG. 7. As apparent in FIG. 7, the negative electrode potential at a depth of discharge of 10% is 1.57 V (vs. Li/Li$^+$), and the negative electrode potential at a depth of discharge of 90% is 1.58 V (vs. Li/Li$^+$). Therefore, the difference in electric potential is 0.01 V between the negative electrode potential versus lithium at a depth of discharge of 10% and the negative electrode potential versus lithium at a depth of discharge of 90%.

Concerning the negative electrodes of the other test cells, the differences between the negative electrode potential versus lithium at a depth of discharge of 10% and the negative electrode potential versus lithium at a depth of discharge of 90% are shown in Table 1 to Table 6.

TABLE 1

|  | First positive electrode active material | Second positive electrode active material | Weight ratio of first positive electrode active material (weight %) | Negative electrode active material | Difference of negative electrode potential (V) | Difference in cell voltage (V) | 10 second direct current resistance (mΩ) |
| --- | --- | --- | --- | --- | --- | --- | --- |
| Example A-1 | Triplite type LiFe$_{0.9}$Mn$_{0.1}$SO$_4$F | Tavorite type LiFe$_{0.9}$Mn$_{0.1}$SO$_4$F | 90 | Li$_4$Ti$_5$O$_{12}$ | 0.01 | 0.46 | 29 |
| Example A-2 | Triplite type LiFe$_{0.9}$Mn$_{0.1}$SO$_4$F | Tavorite type LiFe$_{0.9}$Mn$_{0.1}$SO$_4$F | 80 | Li$_4$Ti$_5$O$_{12}$ | 0.01 | 0.44 | 28 |
| Example A-3 | Triplite type LiFe$_{0.9}$Mn$_{0.1}$SO$_4$F | Tavorite type LiFe$_{0.9}$Mn$_{0.1}$SO$_4$F | 70 | Li$_4$Ti$_5$O$_{12}$ | 0.01 | 0.45 | 26 |

TABLE 1-continued

|   | First positive electrode active material | Second positive electrode active material | Weight ratio of first positive electrode active material (weight %) | Negative electrode active material | Difference of negative electrode potential (V) | Difference in cell voltage (V) | 10 second direct current resistance (mΩ) |
|---|---|---|---|---|---|---|---|
| Example A-4 | Triplite type $LiFe_{0.9}Mn_{0.1}SO_4F$ | Tavorite type $LiFe_{0.9}Mn_{0.1}SO_4F$ | 60 | $Li_4Ti_5O_{12}$ | 0.01 | 0.45 | 24 |
| Example A-5 | Triplite type $LiFe_{0.9}Mn_{0.1}SO_4F$ | Tavorite type $LiFe_{0.9}Mn_{0.1}SO_4F$ | 50 | $Li_4Ti_5O_{12}$ | 0.01 | 0.42 | 24 |
| Example A-6 | Triplite type $LiFe_{0.9}Mn_{0.1}SO_4F$ | Tavorite type $LiFe_{0.9}Mn_{0.1}SO_4F$ | 40 | $Li_4Ti_5O_{12}$ | 0.01 | 0.43 | 23 |
| Example A-7 | Triplite type $LiFe_{0.9}Mn_{0.1}SO_4F$ | Tavorite type $LiFe_{0.9}Mn_{0.1}SO_4F$ | 30 | $Li_4Ti_5O_{12}$ | 0.01 | 0.43 | 21 |
| Example A-8 | Triplite type $LiFe_{0.9}Mn_{0.1}SO_4F$ | Tavorite type $LiFe_{0.9}Mn_{0.1}SO_4F$ | 20 | $Li_4Ti_5O_{12}$ | 0.01 | 0.4 | 20 |
| Example A-9 | Triplite type $LiFe_{0.9}Mn_{0.1}SO_4F$ | Tavorite type $LiFe_{0.9}Mn_{0.1}SO_4F$ | 10 | $Li_4Ti_5O_{12}$ | 0.01 | 0.32 | 20 |
| Comparative Example A-1 | Triplite type $LiFe_{0.9}Mn_{0.1}SO_4F$ | None | 100 | $Li_4Ti_5O_{12}$ | 0.01 | 0.48 | 35 |
| Comparative Example A-2 | None | Tavorite type $LiFe_{0.9}Mn_{0.1}SO_4F$ | 0 | $Li_4Ti_5O_{12}$ | 0.01 | 0.25 | 19 |

TABLE 2

|   | First positive electrode active material | Second positive electrode active material | Weight ratio of first positive electrode active material (weight %) | Negative electrode active material | Difference of negative electrode potential (V) | Difference in cell voltage (V) | 10 second direct current resistance (mΩ) |
|---|---|---|---|---|---|---|---|
| Example B-1 | Triplite type $LiFe_{0.9}Mn_{0.1}SO_4F$ | Tavorite type $LiFe_{0.9}Mn_{0.1}SO_4F$ | 90 | $TiO_2(B)$ | 0.23 | 0.68 | 32 |
| Example B-2 | Triplite type $LiFe_{0.9}Mn_{0.1}SO_4F$ | Tavorite type $LiFe_{0.9}Mn_{0.1}SO_4F$ | 80 | $TiO_2(B)$ | 0.23 | 0.66 | 31 |
| Example B-3 | Triplite type $LiFe_{0.9}Mn_{0.1}SO_4F$ | Tavorite type $LiFe_{0.9}Mn_{0.1}SO_4F$ | 70 | $TiO_2(B)$ | 0.23 | 0.67 | 29 |
| Example B-4 | Triplite type $LiFe_{0.9}Mn_{0.1}SO_4F$ | Tavorite type $LiFe_{0.9}Mn_{0.1}SO_4F$ | 60 | $TiO_2(B)$ | 0.23 | 0.67 | 27 |
| Example B-5 | Triplite type $LiFe_{0.9}Mn_{0.1}SO_4F$ | Tavorite type $LiFe_{0.9}Mn_{0.1}SO_4F$ | 50 | $TiO_2(B)$ | 0.23 | 0.64 | 27 |
| Example B-6 | Triplite type $LiFe_{0.9}Mn_{0.1}SO_4F$ | Tavorite type $LiFe_{0.9}Mn_{0.1}SO_4F$ | 40 | $TiO_2(B)$ | 0.23 | 0.65 | 25 |
| Example B-7 | Triplite type $LiFe_{0.9}Mn_{0.1}SO_4F$ | Tavorite type $LiFe_{0.9}Mn_{0.1}SO_4F$ | 30 | $TiO_2(B)$ | 0.23 | 0.65 | 23 |
| Example B-8 | Triplite type $LiFe_{0.9}Mn_{0.1}SO_4F$ | Tavorite type $LiFe_{0.9}Mn_{0.1}SO_4F$ | 20 | $TiO_2(B)$ | 0.23 | 0.62 | 23 |
| Example B-9 | Triplite type $LiFe_{0.9}Mn_{0.1}SO_4F$ | Tavorite type $LiFe_{0.9}Mn_{0.1}SO_4F$ | 10 | $TiO_2(B)$ | 0.23 | 0.53 | 22 |
| Comparative Example B-1 | Triplite type $LiFe_{0.9}Mn_{0.1}SO_4F$ | None | 100 | $TiO_2(B)$ | 0.23 | 0.71 | 37 |
| Comparative Example B-2 | None | Tavorite type $LiFe_{0.9}Mn_{0.1}SO_4F$ | 0 | $TiO_2(B)$ | 0.23 | 0.47 | 21 |

TABLE 3

|   | First positive electrode active material | Second positive electrode active material | Weight ratio of first positive electrode active material (weight %) | Negative electrode active material | Difference of negative electrode potential (V) | Difference in cell voltage (V) | 10 second direct current resistance (mΩ) |
|---|---|---|---|---|---|---|---|
| Example C-1 | Triplite type $LiFe_{0.9}Mn_{0.1}SO_4F$ | Tavorite type $LiFe_{0.9}Mn_{0.1}SO_4F$ | 90 | $Nb_2TiO_7$ | 0.30 | 0.79 | 33 |
| Example C-2 | Triplite type $LiFe_{0.9}Mn_{0.1}SO_4F$ | Tavorite type $LiFe_{0.9}Mn_{0.1}SO_4F$ | 80 | $Nb_2TiO_7$ | 0.30 | 0.77 | 33 |
| Example C-3 | Triplite type $LiFe_{0.9}Mn_{0.1}SO_4F$ | Tavorite type $LiFe_{0.9}Mn_{0.1}SO_4F$ | 70 | $Nb_2TiO_7$ | 0.30 | 0.78 | 31 |
| Example C-4 | Triplite type $LiFe_{0.9}Mn_{0.1}SO_4F$ | Tavorite type $LiFe_{0.9}Mn_{0.1}SO_4F$ | 60 | $Nb_2TiO_7$ | 0.30 | 0.78 | 29 |
| Example C-5 | Triplite type $LiFe_{0.9}Mn_{0.1}SO_4F$ | Tavorite type $LiFe_{0.9}Mn_{0.1}SO_4F$ | 50 | $Nb_2TiO_7$ | 0.30 | 0.75 | 28 |
| Example C-6 | Triplite type $LiFe_{0.9}Mn_{0.1}SO_4F$ | Tavorite type $LiFe_{0.9}Mn_{0.1}SO_4F$ | 40 | $Nb_2TiO_7$ | 0.30 | 0.76 | 27 |
| Example C-7 | Triplite type $LiFe_{0.9}Mn_{0.1}SO_4F$ | Tavorite type $LiFe_{0.9}Mn_{0.1}SO_4F$ | 30 | $Nb_2TiO_7$ | 0.30 | 0.76 | 26 |

TABLE 3-continued

|  | First positive electrode active material | Second positive electrode active material | Weight ratio of first positive electrode active material (weight %) | Negative electrode active material | Difference of negative electrode potential (V) | Difference in cell voltage (V) | 10 second direct current resistance (mΩ) |
|---|---|---|---|---|---|---|---|
| Example C-8 | Triplite type $LiFe_{0.9}Mn_{0.1}SO_4F$ | Tavorite type $LiFe_{0.9}Mn_{0.1}SO_4F$ | 20 | $Nb_2TiO_7$ | 0.30 | 0.73 | 25 |
| Example C-9 | Triplite type $LiFe_{0.9}Mn_{0.1}SO_4F$ | Tavorite type $LiFe_{0.9}Mn_{0.1}SO_4F$ | 10 | $Nb_2TiO_7$ | 0.30 | 0.65 | 24 |
| Comparative Example C-1 | Triplite type $LiFe_{0.9}Mn_{0.1}SO_4F$ | None | 100 | $Nb_2TiO_7$ | 0.30 | 0.82 | 39 |
| Comparative Example C-2 | None | Tavorite type $LiFe_{0.9}Mn_{0.1}SO_4F$ | 0 | $Nb_2TiO_7$ | 0.30 | 0.57 | 23 |

TABLE 4

|  | First positive electrode active material | Second positive electrode active material | Weight ratio of first positive electrode active material (weight %) | Negative electrode active material | Difference of negative electrode potential (V) | Difference in cell voltage (V) | 10 second direct current resistance (mΩ) |
|---|---|---|---|---|---|---|---|
| Example D-1 | Triplite type $LiFe_{0.9}Mn_{0.1}SO_4F$ | Tavorite type $LiFe_{0.9}Mn_{0.1}SO_4F$ | 90 | Graphite | 0.12 | 0.56 | 33 |
| Example D-2 | Triplite type $LiFe_{0.9}Mn_{0.1}SO_4F$ | Tavorite type $LiFe_{0.9}Mn_{0.1}SO_4F$ | 80 | Graphite | 0.12 | 0.54 | 32 |
| Example D-3 | Triplite type $LiFe_{0.9}Mn_{0.1}SO_4F$ | Tavorite type $LiFe_{0.9}Mn_{0.1}SO_4F$ | 70 | Graphite | 0.12 | 0.56 | 31 |
| Example D-4 | Triplite type $LiFe_{0.9}Mn_{0.1}SO_4F$ | Tavorite type $LiFe_{0.9}Mn_{0.1}SO_4F$ | 60 | Graphite | 0.12 | 0.56 | 30 |
| Example D-5 | Triplite type $LiFe_{0.9}Mn_{0.1}SO_4F$ | Tavorite type $LiFe_{0.9}Mn_{0.1}SO_4F$ | 50 | Graphite | 0.12 | 0.56 | 28 |
| Example D-6 | Triplite type $LiFe_{0.9}Mn_{0.1}SO_4F$ | Tavorite type $LiFe_{0.9}Mn_{0.1}SO_4F$ | 40 | Graphite | 0.12 | 0.54 | 28 |
| Example D-7 | Triplite type $LiFe_{0.9}Mn_{0.1}SO_4F$ | Tavorite type $LiFe_{0.9}Mn_{0.1}SO_4F$ | 30 | Graphite | 0.12 | 0.54 | 27 |
| Example D-8 | Triplite type $LiFe_{0.9}Mn_{0.1}SO_4F$ | Tavorite type $LiFe_{0.9}Mn_{0.1}SO_4F$ | 20 | Graphite | 0.12 | 0.51 | 25 |
| Example D-9 | Triplite type $LiFe_{0.9}Mn_{0.1}SO_4F$ | Tavorite type $LiFe_{0.9}Mn_{0.1}SO_4F$ | 10 | Graphite | 0.12 | 0.42 | 25 |
| Comparative Example D-1 | Triplite type $LiFe_{0.9}Mn_{0.1}SO_4F$ | None | 100 | Graphite | 0.12 | 0.59 | 39 |
| Comparative Example D-2 | None | Tavorite type $LiFe_{0.9}Mn_{0.1}SO_4F$ | 0 | Graphite | 0.12 | 0.34 | 24 |

TABLE 5

|  | First positive electrode active material | Second positive electrode active material | Weight ratio of first positive electrode active material (weight %) | Negative electrode active material | Difference of negative electrode potential (V) | Difference in cell voltage (V) | 10 second direct current resistance (mΩ) |
|---|---|---|---|---|---|---|---|
| Example E-1 | Triplite type $LiFe_{0.9}Zn_{0.1}SO_4F$ | Tavorite type $LiFe_{0.9}Mn_{0.1}SO_4F$ | 90 | $Li_4Ti_5O_{12}$ | 0.01 | 0.44 | 28 |
| Example E-2 | Triplite type $LiFe_{0.9}Zn_{0.1}SO_4F$ | Tavorite type $LiFe_{0.9}Mn_{0.1}SO_4F$ | 80 | $Li_4Ti_5O_{12}$ | 0.01 | 0.43 | 27 |
| Example E-3 | Triplite type $LiFe_{0.9}Zn_{0.1}SO_4F$ | Tavorite type $LiFe_{0.9}Mn_{0.1}SO_4F$ | 70 | $Li_4Ti_5O_{12}$ | 0.01 | 0.44 | 25 |
| Example E-4 | Triplite type $LiFe_{0.9}Zn_{0.1}SO_4F$ | Tavorite type $LiFe_{0.9}Mn_{0.1}SO_4F$ | 60 | $Li_4Ti_5O_{12}$ | 0.01 | 0.44 | 24 |
| Example E-5 | Triplite type $LiFe_{0.9}Zn_{0.1}SO_4F$ | Tavorite type $LiFe_{0.9}Mn_{0.1}SO_4F$ | 50 | $Li_4Ti_5O_{12}$ | 0.01 | 0.43 | 23 |
| Example E-6 | Triplite type $LiFe_{0.9}Zn_{0.1}SO_4F$ | Tavorite type $LiFe_{0.9}Mn_{0.1}SO_4F$ | 40 | $Li_4Ti_5O_{12}$ | 0.01 | 0.43 | 22 |
| Example E-7 | Triplite type $LiFe_{0.9}Zn_{0.1}SO_4F$ | Tavorite type $LiFe_{0.9}Mn_{0.1}SO_4F$ | 30 | $Li_4Ti_5O_{12}$ | 0.01 | 0.43 | 21 |

TABLE 5-continued

| | First positive electrode active material | Second positive electrode active material | Weight ratio of first positive electrode active material (weight %) | Negative electrode active material | Difference of negative electrode potential (V) | Difference in cell voltage(V) | 10 second direct current resistance (mΩ) |
|---|---|---|---|---|---|---|---|
| Example E-8 | Triplite type $LiFe_{0.9}Zn_{0.1}SO_4F$ | Tavorite type $LiFe_{0.9}Mn_{0.1}SO_4F$ | 20 | $Li_4Ti_5O_{12}$ | 0.01 | 0.41 | 20 |
| Example E-9 | Triplite type $LiFe_{0.9}Zn_{0.1}SO_4F$ | Tavorite type $LiFe_{0.9}Mn_{0.1}SO_4F$ | 10 | $Li_4Ti_5O_{12}$ | 0.01 | 0.32 | 19 |
| Comparative Example E-1 | Triplite type $LiFe_{0.9}Zn_{0.1}SO_4F$ | None | 100 | $Li_4Ti_5O_{12}$ | 0.01 | 0.46 | 34 |
| Comparative Example E-2 | None | Tavorite type $LiFe_{0.9}Mn_{0.1}SO_4F$ | 0 | $Li_4Ti_5O_{12}$ | 0.01 | 0.24 | 18 |

TABLE 6

| | First positive electrode active material | Second positive electrode active material | Weight ratio of first positive electrode active material (weight %) | Negative electrode active material | Difference of negative electrode potential (V) | Difference in cell voltage(V) | 10 second direct current resistance (mΩ) |
|---|---|---|---|---|---|---|---|
| Example F-1 | Triplite type $LiFe_{0.9}Mn_{0.1}SO_4F$ | Tavorite type $LiFeSO_4F$ | 90 | $Li_4Ti_5O_{12}$ | 0.01 | 0.48 | 30 |
| Example F-2 | Triplite type $LiFe_{0.9}Mn_{0.1}SO_4F$ | Tavorite type $LiFeSO_4F$ | 80 | $Li_4Ti_5O_{12}$ | 0.01 | 0.47 | 29 |
| Example F-3 | Triplite type $LiFe_{0.9}Mn_{0.1}SO_4F$ | Tavorite type $LiFeSO_4F$ | 70 | $Li_4Ti_5O_{12}$ | 0.01 | 0.47 | 27 |
| Example F-4 | Triplite type $LiFe_{0.9}Mn_{0.1}SO_4F$ | Tavorite type $LiFeSO_4F$ | 60 | $Li_4Ti_5O_{12}$ | 0.01 | 0.46 | 25 |
| Example F-5 | Triplite type $LiFe_{0.9}Mn_{0.1}SO_4F$ | Tavorite type $LiFeSO_4F$ | 50 | $Li_4Ti_5O_{12}$ | 0.01 | 0.44 | 24 |
| Example F-6 | Triplite type $LiFe_{0.9}Mn_{0.1}SO_4F$ | Tavorite type $LiFeSO_4F$ | 40 | $Li_4Ti_5O_{12}$ | 0.01 | 0.44 | 24 |
| Example F-7 | Triplite type $LiFe_{0.9}Mn_{0.1}SO_4F$ | Tavorite type $LiFeSO_4F$ | 30 | $Li_4Ti_5O_{12}$ | 0.01 | 0.44 | 23 |
| Example F-8 | Triplite type $LiFe_{0.9}Mn_{0.1}SO_4F$ | Tavorite type $LiFeSO_4F$ | 20 | $Li_4Ti_5O_{12}$ | 0.01 | 0.42 | 22 |
| Example F-9 | Triplite type $LiFe_{0.9}Mn_{0.1}SO_4F$ | Tavorite type $LiFeSO_4F$ | 10 | $Li_4Ti_5O_{12}$ | 0.01 | 0.35 | 22 |
| Comparative Example F-1 | Triplite type $LiFe_{0.9}Mn_{0.1}SO_4F$ | None | 100 | $Li_4Ti_5O_{12}$ | 0.01 | 0.49 | 37 |
| Comparative Example F-2 | None | Tavorite type $LiFeSO_4F$ | 0 | $Li_4Ti_5O_{12}$ | 0.01 | 0.26 | 20 |

As apparent in Table 1, it can be understood that in the batteries of Examples A-1 to A-9, the 10 second direct current resistance at a depth of discharge of 80% is low compared with that of Comparative Example A-1, thus high output can be obtained at a low SOC. As apparent in FIG. 8, in the battery of Comparative Example A-2, the cell voltage change accompanied by the change of the depth of discharge is small compared with that of the other examples. For this reason, in the battery of Comparative Example A-2, the exact measurement of the depth of discharge is difficult. From the facts above, the battery of Example A-1 to A-9 can provide a high output at a low SOC, and the measurement of the depth of discharge can be easily performed.

As is readily understood from Table 2, for the battery of Examples B-1 to B-9, the 10 second direct current resistance at a depth of discharge of 80% is small compared with Comparative Example B-1, thus a high output can be obtained at a low SOC. In addition, as apparent in FIG. 9, for the battery of Comparative Example B-2, the cell voltage change accompanied by the change in the depth of discharge is small compared with that of the other Examples. For this reason, it is difficult to exactly measure the depth of discharge of the battery of Comparative Example B-2. From the facts above, for the battery of Examples B-1 to B-9, a high output can be obtained at a low SOC, and measurement of the depth of discharge can be easily performed.

As can be understood from Table 3, in the battery of Example C-1 to C-9, the 10 second direct current resistance at a depth of discharge of 80% is small compared with Comparative Example C-1, thus a high output can be obtained at a low SOC. In addition, as apparent in FIG. 10, for the battery of Comparative Example C-2, the cell voltage change accompanied by the change of the depth of discharge is small compared with that of the other Examples. For this reason, it is difficult to exactly measure the depth of discharge of the battery of Comparative Example C-2. From the facts above, for the battery of Examples C-1 to C-9, a high output can be obtained at a low SOC, and measurement of the depth of discharge can be easily performed.

As is readily understood from Table 4, for the battery of Examples D-1 to D-9, the 10 second direct current resistance at a depth of discharge of 80% is small compared with Comparative Example D-1, thus a high output can be obtained at a low SOC. In addition, as apparent in FIG. 11, for the battery of Comparative Example D-2, the cell voltage change accompanied by the change of depth of discharge is small compared with that of the other Examples. For this reason, it is difficult to exactly measure the depth of discharge of the battery of Comparative Example D-2. From the facts above, for the battery of Examples D-1 to D-9, a high output can be obtained at a low SOC, and measurement of the depth of discharge can be easily performed.

As is readily understood from Table 5, for the battery of Examples E-1 to E-9, the 10 second direct current resistance at a depth of discharge of 80% is small compared with Comparative Example E-1, thus a high output can be obtained at a low SOC. For the battery of Comparative Example E-2, the cell voltage change accompanied by the change in depth of discharge is small compared with that of the other Examples in the same way as Comparative Example A-2. For this reason, it is difficult to exactly measure the depth of discharge of the battery of Comparative Example E-2. From the facts above, for the battery of Examples E-1 to E-9, a high output can be obtained at a low SOC, and measurement of the depth of discharge can be easily performed.

As is readily understood from Table 6, in the battery of Examples F-1 to F-9, the 10 second direct current resistance at a depth of discharge of 80% is small compared with Comparative Example F-1, thus a high output can be obtained at a low SOC. In addition, for the battery of Comparative Example F-2, a cell voltage change accompanied by the change in depth of discharge is small compared with that of the other Examples. For this reason, it is difficult to exactly measure the depth of discharge of the battery of Comparative Example F-2. From the facts above, for the battery of Examples F-1 to F-9, a high output can be obtained at a low SOC, and measurement of the depth of discharge can be easily performed.

According to the nonaqueous electrolyte battery of at least one embodiment and Example described above, a high output can be obtained at a low SOC, and measurement of the depth of discharge can be easily performed, and further, the energy density can be increased as the battery contains the first positive electrode active material and the second positive electrode active material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode comprising particles of a first positive electrode active material which is represented by general formula $LiMSO_4F$, wherein M is at least one element selected from the group consisting of Fe, Mn and Zn and has a triplite type crystal structure, and particles of a second positive electrode active material which is represented by general formula $LiM'SO_4F$ (M' is at least one kind of element selected from the group consisting of Fe, Mn and Zn) and has a tavorite type crystal structure;
a negative electrode comprising a negative electrode active material comprising at least one selected from a group consisting of a lithium titanium oxide, a titanium oxide, a niobium titanium composite oxide and a carbon material; and
a nonaqueous electrolyte,
wherein a ratio of the first positive electrode active material to the total mass of the first positive electrode active material and the second positive electrode active material is from 10 mass % to 40 mass %.

2. The battery according to claim 1, wherein a negative electrode potential difference is not more than 0.3 V between a negative electrode potential versus lithium at a depth of discharge of 10% and negative electrode potential versus lithium at a depth of discharge of 90% when the nonaqueous electrolyte battery is discharged from a fully charged state to a completely discharged state at a 0.2 C rate.

3. The battery according to claim 1, wherein an average diameter of the particles of the first positive electrode active material and an average diameter of the particles of the second positive electrode active material fall within a range of from 0.1 μm to 10 μm.

4. The battery according to claim 1, wherein the negative electrode active material comprises a lithium-titanium oxide having a spinel structure.

5. The battery according to claim 1, wherein the negative electrode active material comprises monoclinic $TiO_2$.

6. The battery according to claim 1, wherein the negative electrode active material comprises $Li_xNb_aTi_bO_c$ wherein $0 \leq x \leq 3$, $0 < a \leq 3$, $0 < b \leq 3$, and $5 \leq c \leq 10$.

7. The battery according to claim 6, wherein a part of Nb or a part of Ti in the $Li_xNb_aTi_bO_c$ is substituted by at least one element selected from a group consisting of V, Zr, Ta, Cr, Mo, W, Ca, Mg, Al, Fe, Si, B, P, K, and Na.

8. A battery pack comprising the nonaqueous electrolyte battery according to claim 1.

9. The battery according to claim 1, wherein the ratio of the first positive electrode active material to the total mass of the first positive electrode active material and the second positive electrode active material is in a range of 10 mass % to 20 mass %.

10. The battery according to claim 1, wherein the positive electrode comprises a positive electrode current collector and a positive electrode material layer formed on at least one side surface of the positive electrode current collector, and comprising the particles of the first positive electrode active material, the particles of the second positive electrode active material, a conducting agent and a binder.

11. The battery according to claim 10, wherein the conducting agent comprises at least one selected from the group consisting of acetylene black, carbon black, and graphite.

* * * * *